F. ZALESKI AND A. R. SCHOENKY.
SEWING MACHINE.
APPLICATION FILED SEPT. 24, 1918.

1,361,952.

Patented Dec. 14, 1920.
13 SHEETS—SHEET 1.

Inventors
Frank Zaleski &
August R. Schoenky,
by Rogers, Kennedy & Campbell,
Attys

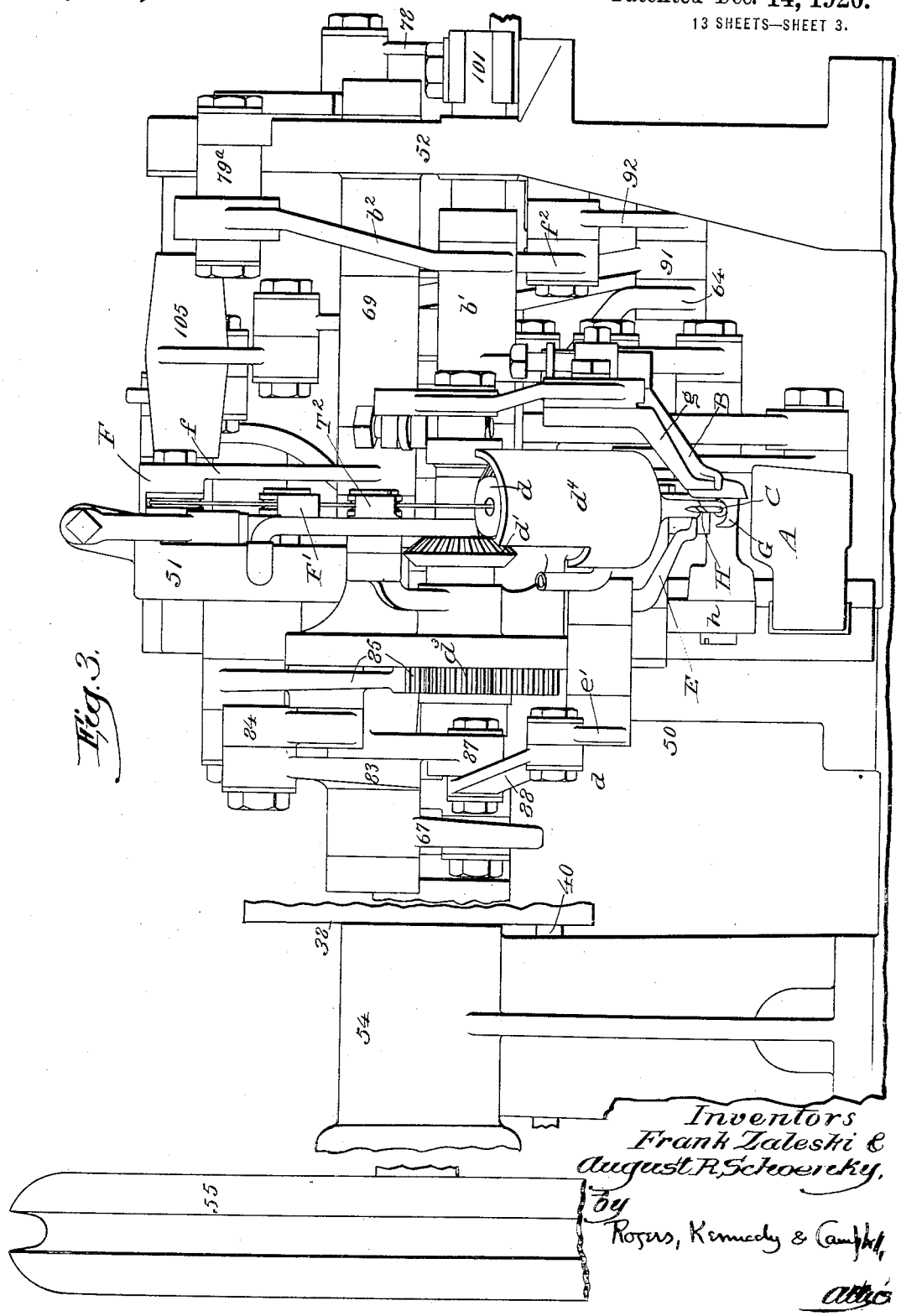

F. ZALESKI AND A. R. SCHOENKY.
SEWING MACHINE.
APPLICATION FILED SEPT. 24, 1918.
1,361,952.
Patented Dec. 14, 1920.
13 SHEETS—SHEET 4.
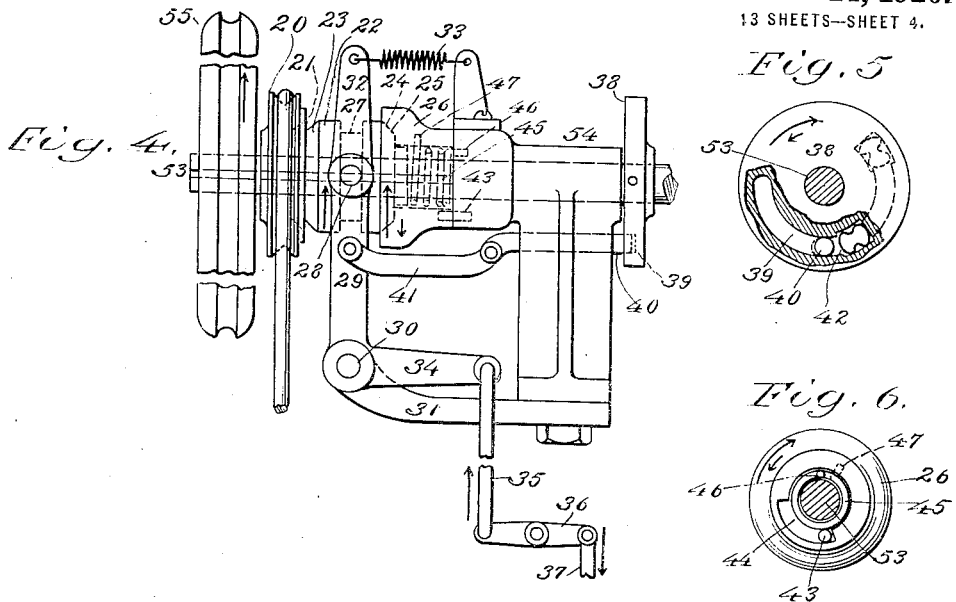
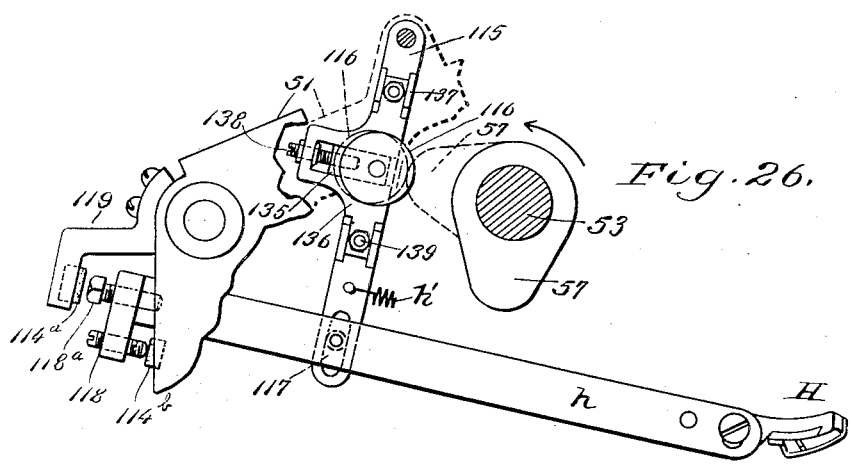
INVENTORS
*Frank Zaleski &
August R. Schoenky,*
BY
Rodgers, Kennedy & Campbell
ATTORNEYS.

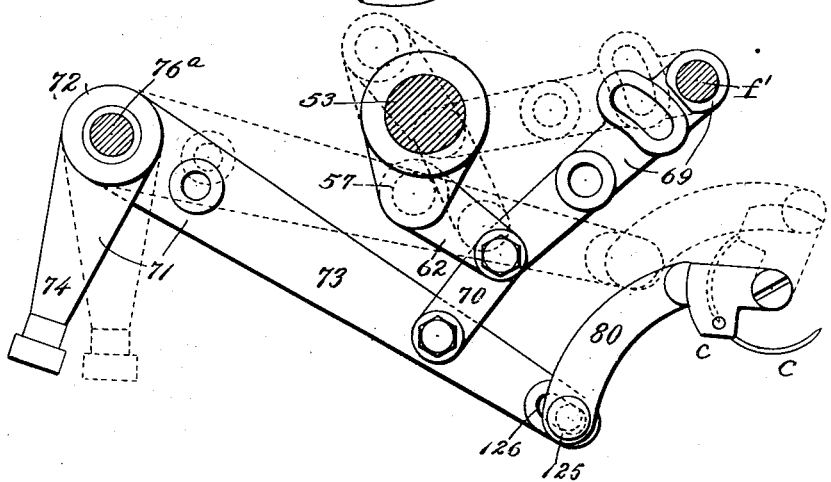
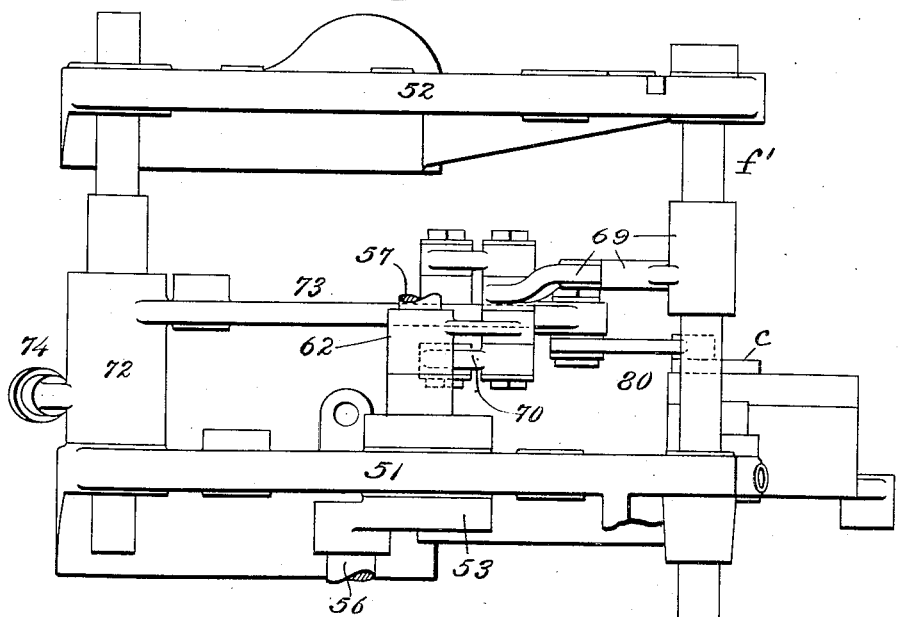

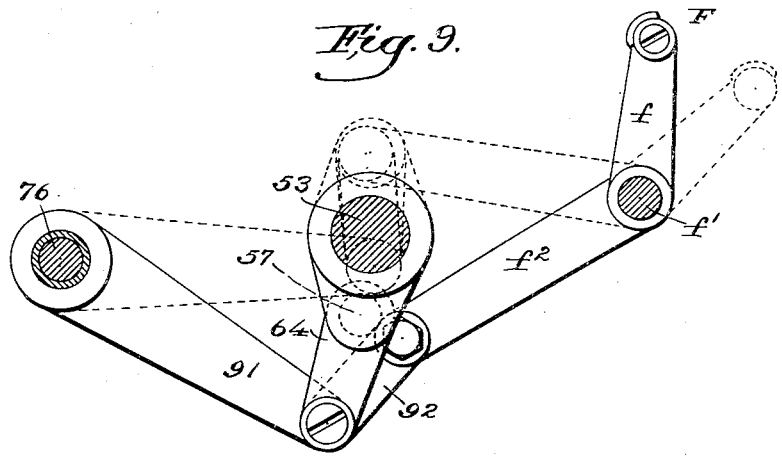
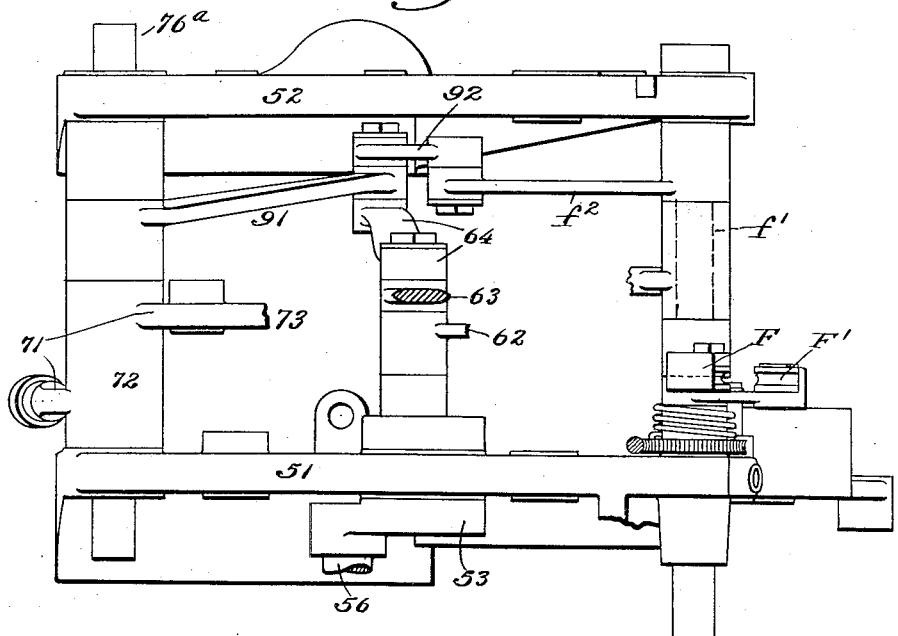

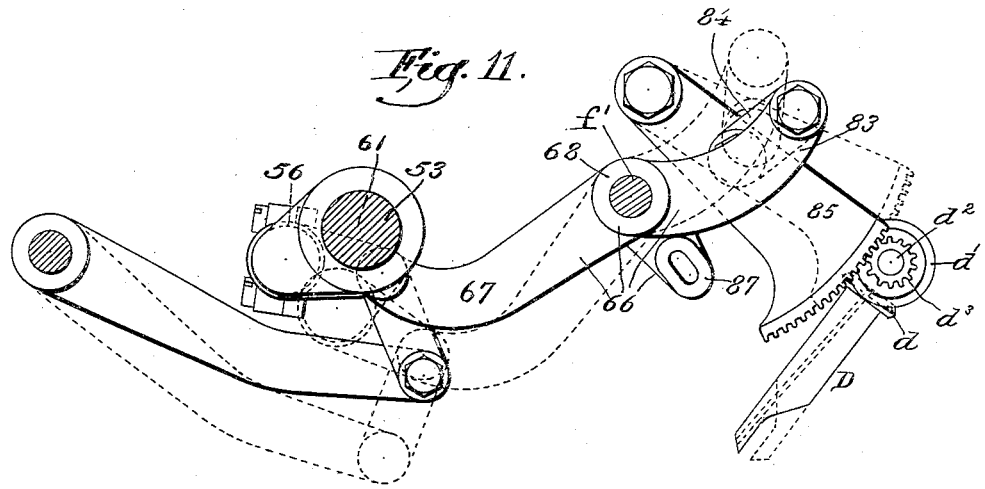
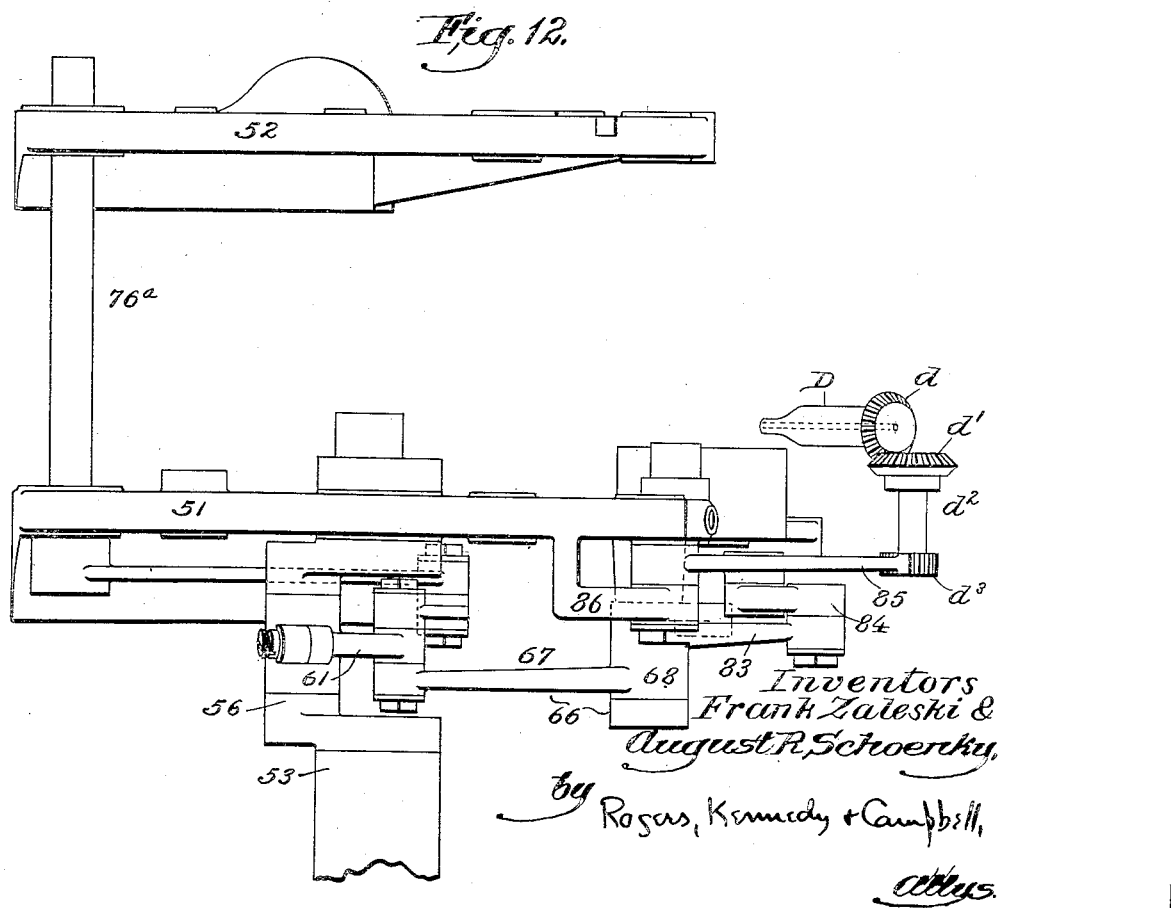

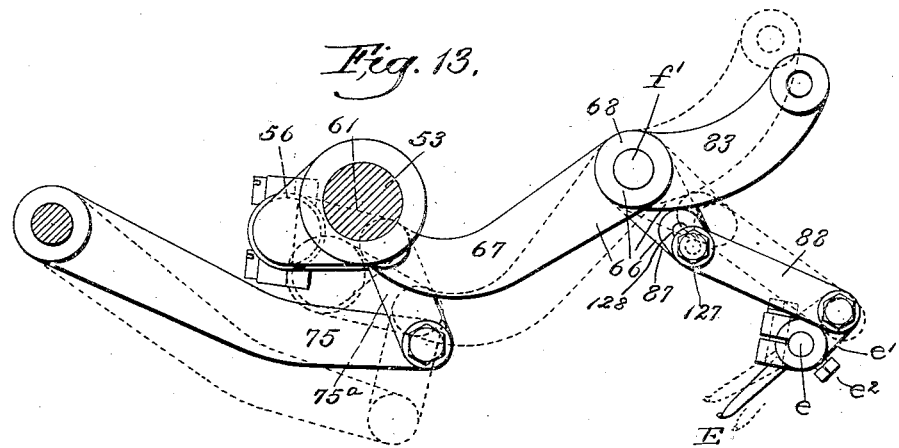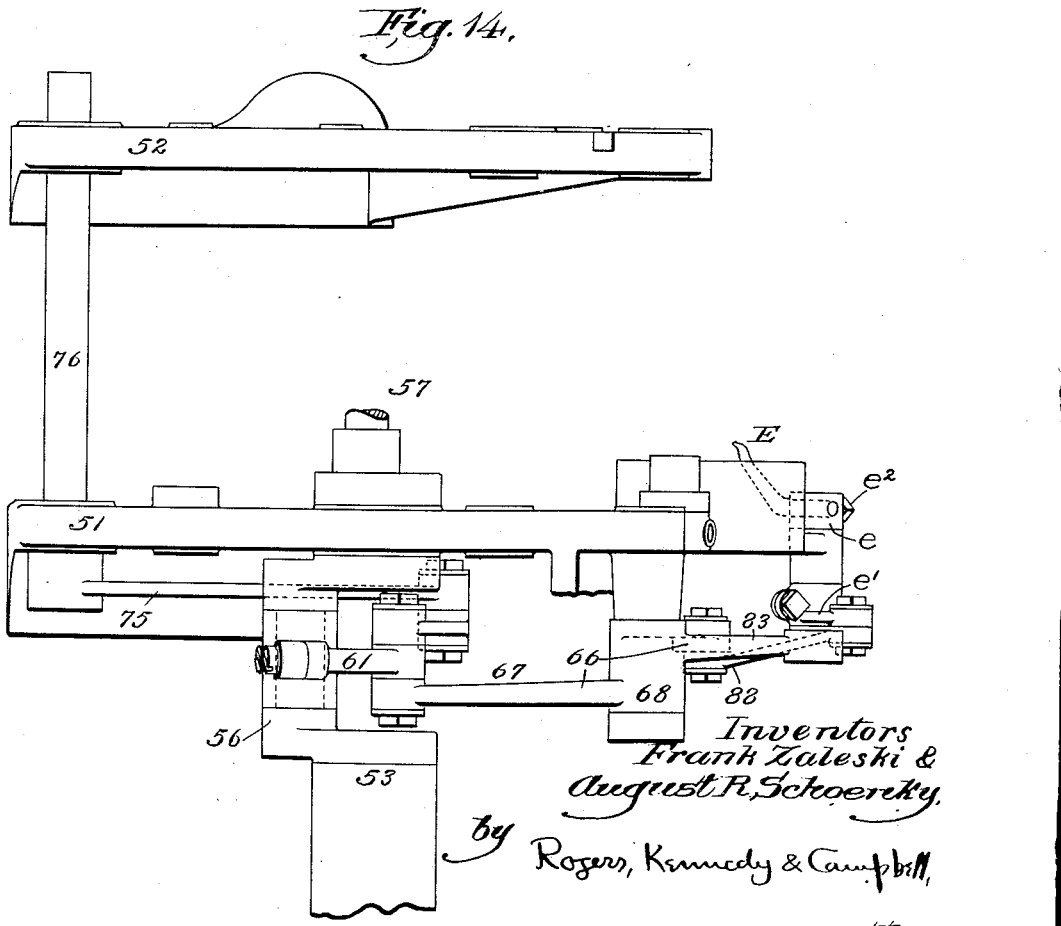

F. ZALESKI AND A. R. SCHOENKY.
SEWING MACHINE.
APPLICATION FILED SEPT. 24, 1918.

1,361,952.

Patented Dec. 14, 1920.
13 SHEETS—SHEET 9.

Inventors
Frank Zaleski &
August R. Schoenky,
by Rogers, Kennedy & Campbell,
Attys.

F. ZALESKI AND A. R. SCHOENKY.
SEWING MACHINE.
APPLICATION FILED SEPT. 24, 1918.

1,361,952.

Patented Dec. 14, 1920.
13 SHEETS—SHEET 10.

Inventors
Frank Zaleski &
August R. Schoenky
by Rogers, Kennedy & Campbell
Attys.

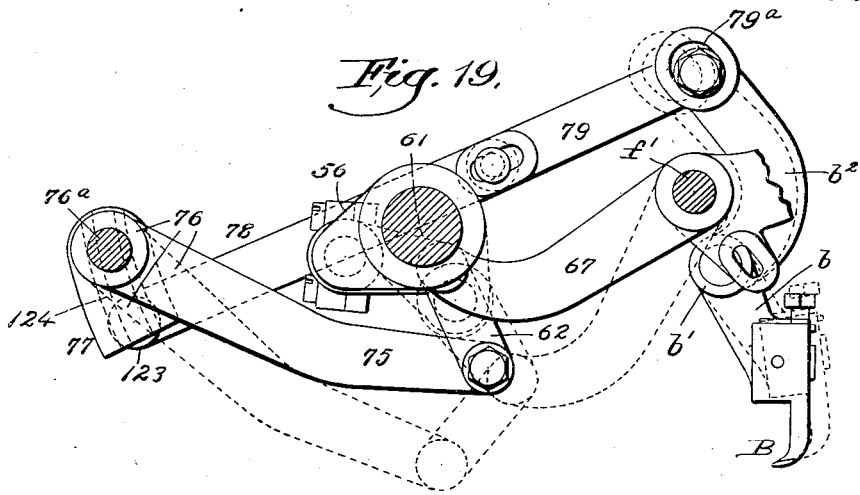
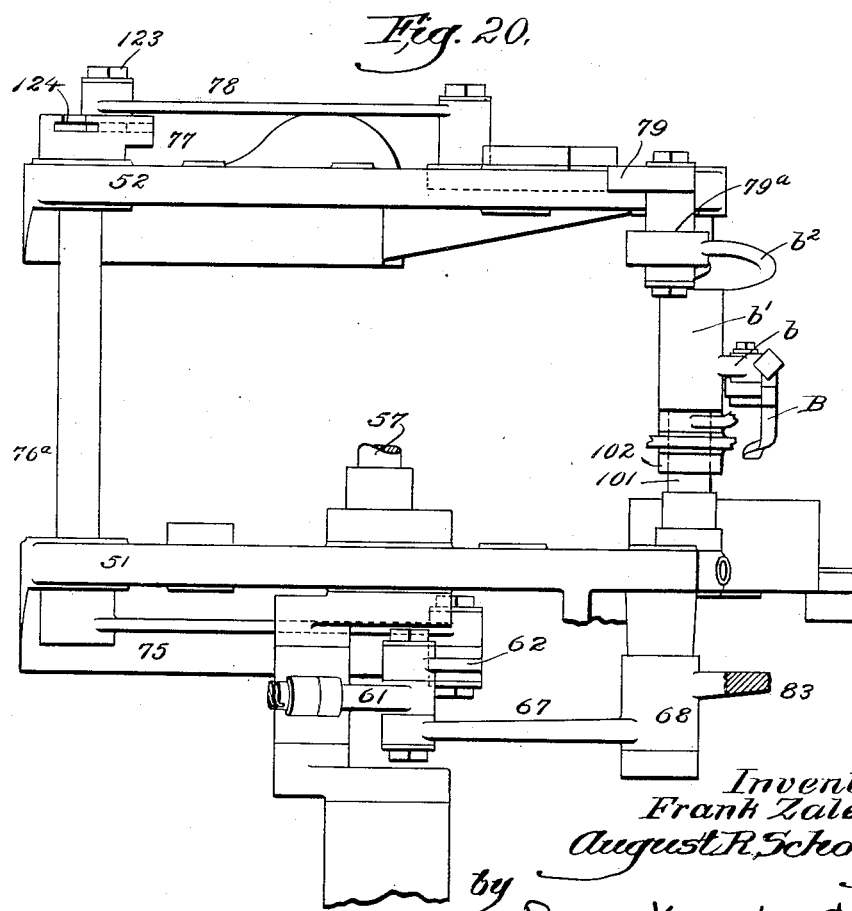

F. ZALESKI AND A. R. SCHOENKY.
SEWING MACHINE.
APPLICATION FILED SEPT. 24, 1918.

1,361,952.

Patented Dec. 14, 1920.
13 SHEETS—SHEET 12.

Inventors
Frank Zaleski &
August R. Schoenky,
by Rogers, Kennedy & Campbell
Attys.

F. ZALESKI AND A. R. SCHOENKY.
SEWING MACHINE.
APPLICATION FILED SEPT. 24, 1918.
1,361,952.
Patented Dec. 14, 1920.
13 SHEETS—SHEET 13.
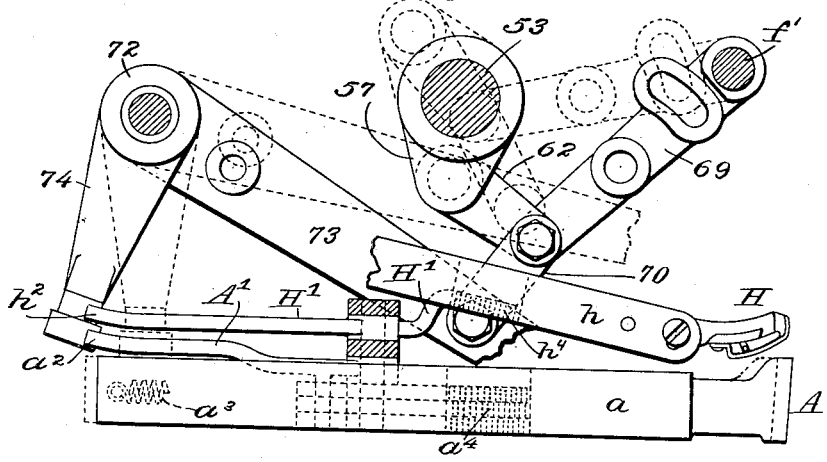
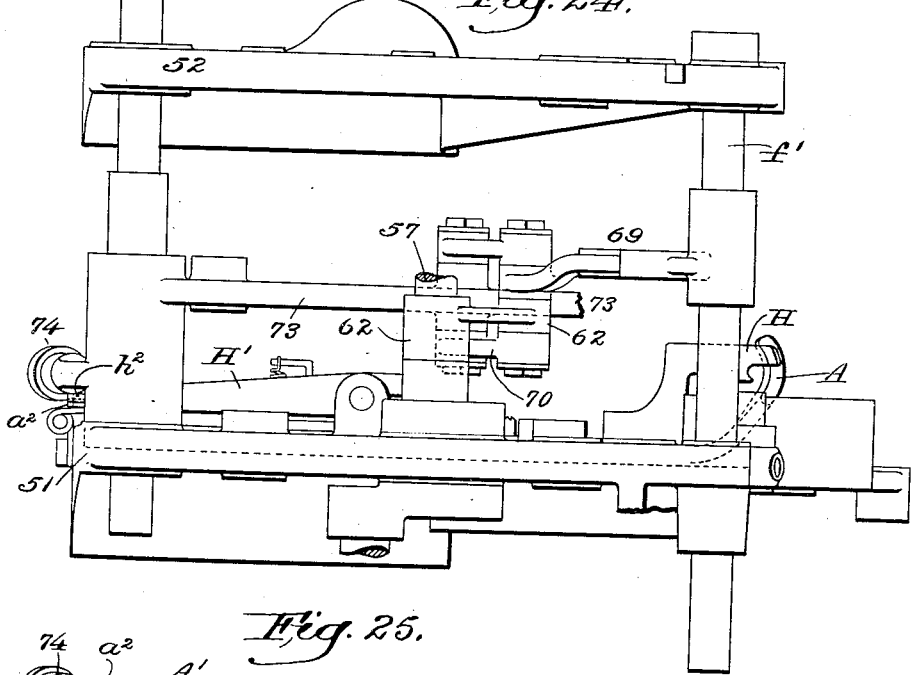
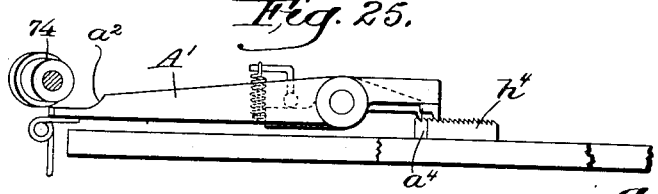
Inventors
Frank Zaleski &
August R. Schoenky,
by
Rogers, Kennedy & Campbell,
Attys.

# UNITED STATES PATENT OFFICE.

FRANK ZALESKI, OF BOSTON, AND AUGUST R. SCHOENKY, OF SOMERVILLE, MASSACHUSETTS, ASSIGNORS TO REECE SHOE MACHINERY COMPANY, OF BOSTON, MASSACHUSETTS, A CORPORATION OF MAINE.

SEWING-MACHINE.

1,361,952.   Specification of Letters Patent.   Patented Dec. 14, 1920.

Application filed September 24, 1918. Serial No. 255,536.

*To all whom it may concern:*

Be it known that we, FRANK ZALESKI and AUGUST R. SCHOENKY, respectively subject of the German Emperor and citizen of the United States, residing at Boston, county of Suffolk, and at Somerville, in the county of Middlesex, respectively, and State of Massachusetts, have invented certain new and useful Improvements in Sewing-Machines, of which the following is a specification, reference being had therein to the accompanying drawing.

This invention relates to sewing machines and more particularly to a novel machine for stitching shoe upper to sole lip. This very special class of machine is employed for producing a chain stitch, by the aid of a hooked, curved needle, and coöperating movable stitching instruments, namely, thread looper, take-up, and work feed device, and usually also, thread hook, channel guide, welt feed device, and locking means for the latter and for the yielding work support. Such machines are usually designed to serve for either of two purposes, firstly, to stitch the upper and a strip of welt to the projecting lip of the insole of a welt shoe, or, secondly, to stitch the reversed upper to the upstanding lip of the sole of a turn shoe; whence this class of machine is generally known as a "welt and turn" stitching machine.

The particular embodiment of the present invention herein illustrated is in part like that illustrated in our Letters Patent No. 1,288,366, patented December 17, 1918, and to that extent is a continuation thereof, but is also an improvement upon said prior patent. As such improvement, the general object of the present invention is to afford a machine of the special class referred to, which is yet more simple than that shown in said prior patent, possesses fewer moving parts and is therefore lighter in weight and cheaper in first cost, while at the same time quieter and smoother in operation and correspondingly capable of relatively greater speed and output. Such objects are generally explained and largely attained in said prior patent, and are enhanced in the present improved mechanism.

Another object is the improvement in the stopping and restarting of a machine of the class referred to, such as will substantially bring about, without requiring the attention of the operator, the long established procedure of stopping the forward rotation of the main shaft at the end of the stitch cycle with the needle engaged in the work, and will permit subsequently and facilitate the usual and necessary reversal to retract the needle and free the work for removal; with the further advantage that the machine so equipped may be repeatedly stopped and restarted during the stitching of a single shoe without the action of reversal until the desired extraction of the work upon the completion of the seam. Other and more particular objects and advantages of the present improvement will be explained in the hereinafter following description or will be apparent to those skilled in the art.

To the attainment of such objects and advantages the present invention consists in the novel machine, mechanisms, combinations, arrangements, devices and other features herein described or illustrated.

The preferred principle of the present machine, like that in said prior patent, is the operation of stitching instruments with harmonic movements, namely, through an actuating mechanism which derives its actuation from a main operating shaft which is a crank shaft, having a small number of pitmen driven by it for causing the actuation of a substantially larger number of stitching instruments, and a system of oscillating levers and links driven by the pitmen, movable generally in planes perpendicular to the shaft and extending to the instruments to be actuated. This invention enables the transmitting parts to be compactly juxtaposed, so that the several instruments, each with its smooth actuation, may all be located in proper relation to the stitching point, and these advantages are enhanced by the consolidation and reduction of parts, which it will be observed are but few in number for the varied actuation of so many instruments. In said prior patent is contained a diagram indicating the harmonic nature of the motions of the several stitching instruments, which are smooth and free from abrupt action or jar, but as the corresponding motions in the present application are generally of the same character, with similar coöperation, though improved in detail, said diagram is not herein repeated.

In the accompanying drawings forming a part hereof, Figure 1 is an entire left elevation of the head of the machine, the supporting column being omitted as well as the controlling pedals, etc.

Fig. 3 is a front elevation of the machine showing the mechanisms included in Figs. 1 and 2, and the bearing standard and wheel at the left, with the shaft, however, broken away between the standard and wheel, and the stopping mechanism omitted, it being shown in Fig. 4.

Fig. 4 is a front elevation of the parts at the left end of the shaft, including the stopping mechanism between the bearing standard and wheel; while Figs. 5 and 6 are right elevations of the guard disk and the non-rotating clutch member, shown in Fig. 4.

Fig. 7 is a detail left elevation showing so much of the mechanism as takes part in the actuation of the needle C; and Fig. 8 is a plan view thereof.

Fig. 9 is a detail left elevation showing so much of the mechanism as takes part in the actuation of the take-up F; and Fig. 10 is a plan view thereof.

Fig. 11 is a detail left elevation showing so much of the mechanism as takes part in the actuation of the thread looper D; and Fig. 12 is a plan view thereof.

Fig. 13 is a detail left elevation showing so much of the mechanism as takes part in the actuation of the thread hook E; and Fig. 14 is a plan view thereof.

Fig. 19 is a detail left elevation showing so much of the mechanism as takes part in the reciprocation of the channel guide B toward and from the work; and Fig. 20 is a plan view thereof.

Fig. 23 is a detail left elevation showing so much of the mechanism as takes part in the actuation of the locking dogs A' and H' for the work support and welt feed device; and Fig. 24 is a plan view thereof; and Fig. 25 is a broken-away partial plan of parts thereof.

Figure 1:
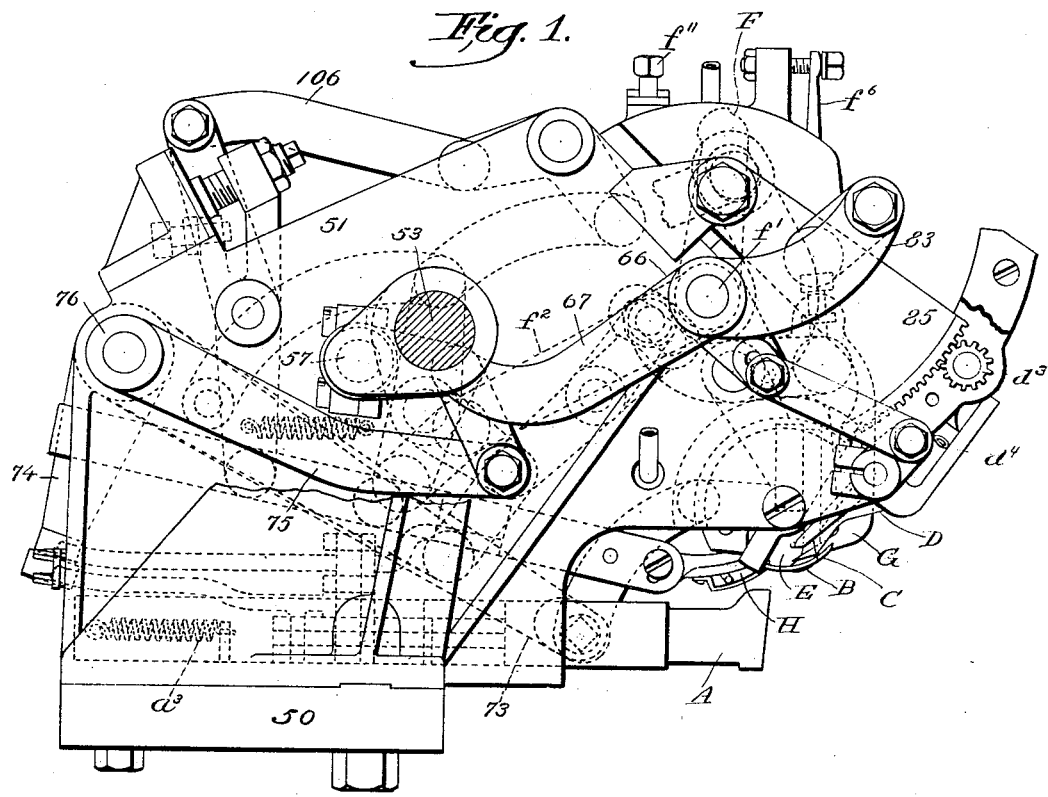

Fig. 26 shows a simplified substitute welt feed device actuating mechanism in left elevation.

For convenience the active instruments which perform operations upon or coöperate with the work (shoe), and thread T, are designated by a system of reference letters, while the general machine parts and mechanical connections for causing the stitching instruments to perform their respective functions at the proper time in the cycle of operations will be designated by numerals. Various well-known or ordinary features or details that will be well understood by those skilled in the art are omitted from the drawings hereof, or are shown in the drawings but omitted from the description, because unnecessary to an understanding of the novel features of the present invention, and the said prior patent may be referred to for various details not herein described.

A work support A, having a sliding shank $a$, presents an upright front surface against which the upper of the inverted shoe bears during the stitching. A spring $a^3$ tends to hold the work support forward. The yielding work support has to be locked forward at a certain point in the cycle of operations and periodically released. A locking dog A', see Figs. 23–25, is utilized for this purpose, coöperating with a toothed rack $a^4$ on the work support shank. As will be explained, the welt guide and feed member H is similarly locked forward, and the two instruments A and H when so locked coöperate effectively to oppose the force of the feed point G as the latter is moved into engagement with the work. They are shortly unlocked so as to take readjusted positions, which is necessary as the work progresses, to avoid impeding the work.

A work guide B, having a shank $b$, is so positioned above the work that the extremity of the guide enters the channel which has been previously formed around the outer margin of the shoe sole, thus giving additional guidance to the shoe and insuring the proper positioning of the stitches. It will be understood that the channel of the sole forms a lip, and that this lip is turned outward by the channel guide B, and thereupon stitched to the shoe upper, and also to the welt in the welt system, thereby connecting the sole, upper and welt. The channel guide is required to undergo slight movements during every cycle of operations. As seen in Figs. 19 and 20, its shank $b$ swings with a hub $b'$ having an arm $b^2$ through which it is actuated.

An oscillating curved needle C has a barb or hook at its forward end, and is carried upon a needle block c in a general forward and rearward direction, the needle in its advancing stroke penetrating first the welt, then the upper, and then the insole, and returning during each stitch, the thread being coöperatively manipulated to produce a continuous line of chain stitching. See Figs. 7 and 8.

A rotary thread looper D of usual form is arranged in a slanting position so that the thread supplied through its hollow interior will be properly placed upon the hook of the needle on each forward stroke of the latter. The looper preferably is oscillated for this purpose to the extent of about one and one-eighth revolutions in alternate directions through a bevel gear $d$ at its upper end, engaged by a similar bevel gear $d'$ on a short gear shaft $d^2$, carrying also a pinion $d^3$, actuated in one direction and then the other by a rack to be later described; see Figs. 11 and 12. A metal box $d^4$ incloses the looper, and is steam-heated, as are several other parts of the machine, to keep the mechanism warm and waxed thread pliable.

Coöperating with the looper in placing the thread on the needle hook is a member E, termed the thread hook. This has an oscillatory movement, being adjustably secured by a set screw $e^2$ in the right-hand end of a short rock shaft $e$, from which also rigidly projects an arm $e'$, actuated as will be later described. See Figs. 13 and 14.

Coöperating with the needle, looper and thread hook is a take-up F, located at the forward end of its carrying arm or shank $f$, mounted on a rock shaft $f'$, which has a rearwardly extending arm $f^2$ for actuation in a manner to be described. See Figs. 9 and 10. Associated with the take-up is a resilient or auxiliary take-up device F', see Figs. 2 and 10. This is a passive instrument comprising an arm oscillating under spring tension between lower and upper stops $f^3$ and $f^4$, and assisting the take-up F in governing the thread T. The upper stop $f^4$ is made slightly resilient to yield enough to prevent thread breakage, by being pivoted at $f^5$, and is held strained away from the outstanding portion 51ª at the right side of wall 51 by a bar spring member $f^6$, rigid with stop $f^4$ and put under strain by the adjustable screw $f^7$. The spring $f^8$ pulls the arm F' downward toward stop $f^3$, which, however, it rarely contacts save when stitching is not proceeding. A toothed wheel $f^9$ loose on the same axle $f'$ as the take-up F and auxiliary take-up F' receives one end of spring $f^8$, the other end being secured to arm F'. The purpose of the wheel $f^9$ is to adjust the tension of the spring, and for this purpose its teeth are engaged by a threaded rod $f^{10}$, having an accessible head $f^{11}$, which can be turned to tighten or loosen the spring.

Thread guides T' and T² are adjustably mounted between the wax pot and take-up, and between the take-up and looper, respectively.

Figure 15:
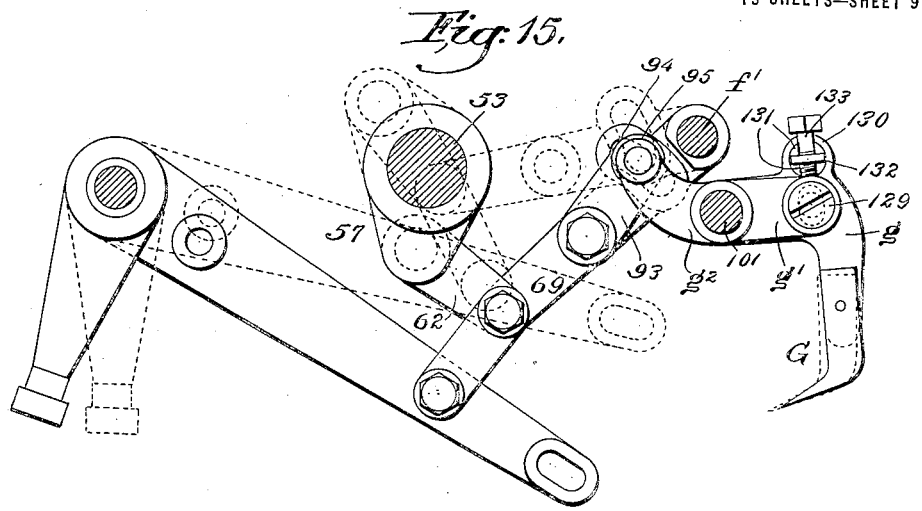
Fig. 15 is a detail left elevation showing so much of the mechanism as takes part in the reciprocation of the work feed device G toward and from the work.
Figure 16:
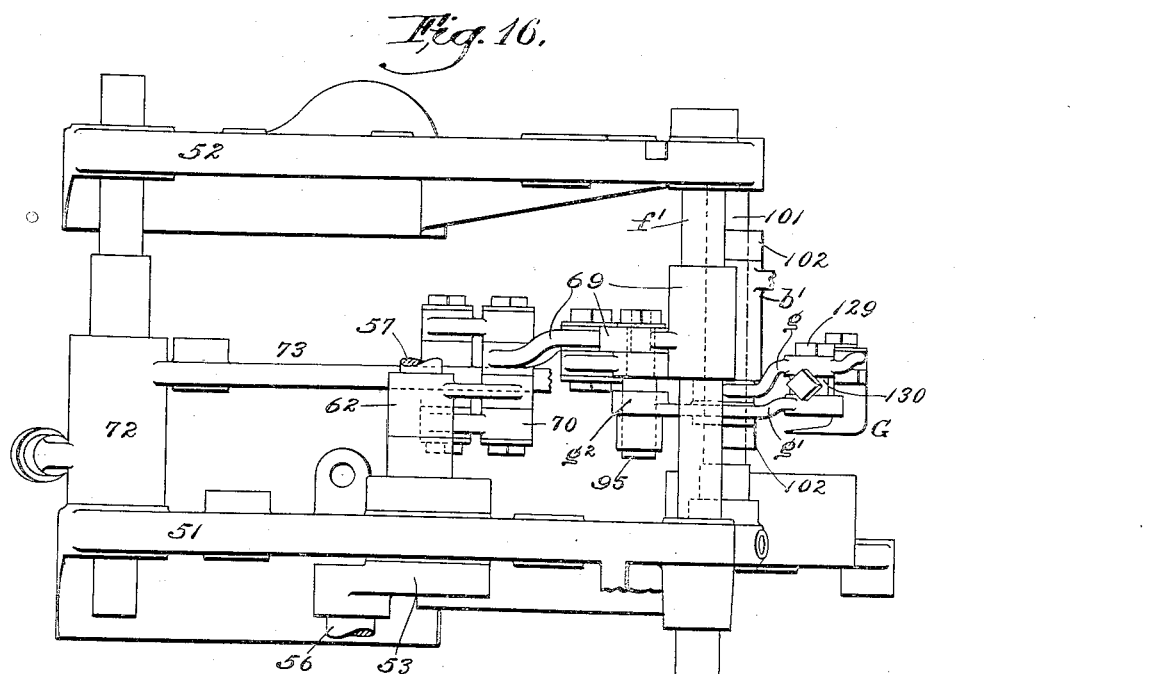
Fig. 16 is a plan view thereof.

A work feeding device or feed point G, formed with an upwardly extending shank or carrying arm $g$, is located to engage with the lip of the shoe sole. See Figs. 15 and 16. Preferably the channel guide B, already mentioned, is recessed, and the feed point G is arranged to pass through such recess in engaging the work. The feed point shank $g$ has its hub loosely rotatable on the slide rod or axle 101. Loose also on the axle is a forward arm $g'$ rigidly connected to $g$, and having a rearward extension $g^2$ by which the feed point is reciprocated, as will be described. Besides its reciprocating movement to and from the work for engaging and disengaging the work, the feed point has also feeding and return movements longitudinally of the work, along the axis or rod or axle 101, for feeding the work forwardly between stitches.

In addition to the above parts A to G is shown a member H, which performs the services both of a welt guide and a welt feeder when welt shoes are stitched, it being carried on a sliding shank $h$, and having a movement during each cycle for feeding the strip of leather or welt to the stitching point in harmony with the advance of the shoe. A spring $h'$ presses the welt feed device forward, and a locking dog H' acting on rack $h^4$ locks it there at certain times. See Figs. 21 to 23.

The diagram in Fig. 1 of said prior patent in general represents the nature of the movements of the stitching instruments. The movements of all the instruments, including the needle, the take-up, the looper and others which would be capable of vibratory or noisy action are herein smooth, quiet and noiseless, because harmonic; and there is no such jerk or thrust to the motions as is involved in cam operated connections, the motion of each of these instruments being, on the contrary, analogous to that of a steam engine crosshead, which undergoes changes of speed and direction with a harmonic motion and without the suggestion of shock or noise. They are practically wearless, thus avoiding the added vibration due to worn parts.

Comprised in the head 50 of the machine, at the top of a suitable column, are two stationary walls 51 at the left and 52 at the right, and spaced apart so as to accommodate mechanism between them as well as beyond each of them. The main shaft 53 of the machine extends transversely within the space between the walls at a location to the rear of the stitching point. The shaft takes its bearing from the frame wall 51 and a bearing standard 54 located at the left of the wall 51. In the present embodiment, all of the operations of the various stitching instruments to be described are effected from this main shaft 53. The shaft is shown provided at its extreme left end with a wheel 55 serving both for engagement by a driving belt and as a hand wheel for reversing or otherwise manipulating the shaft by hand.

The customary mode of stopping a welt and turn stitcher has long been to place the hand upon the wheel 55, bringing the shaft to rest and taking care that the forward rotation continues until the end of a stitch cycle, and then reversing somewhat to retract the needle from the work; but it is highly advantageous to provide a stopping means which will take the operator's attention largely from this function and facilitate his observation and manipulation of the shoe being stitched. The conditions are peculiar in this type of machine, and herein is shown a stop motion for this special apparatus, the principles of which are embodied in the structure illustrated in Figs. 4 to 6. The principle of the operation is to frictionally and promptly stop the forward rotation of the shaft at the proper point in the stitch cycle by a mechanism which is put into action by the operator, e. g., by letting up a pedal, but automatically timed as to the point of stoppage, and the arrangement being of a character to permit the operator after stoppage to reverse the shaft for the purposes stated.

The shaft 53 is shown as extended considerably to the left beyond the bearing 54, with the wheel 55 at its extremity. Instead of running the belt upon the pulley 55, a belt pulley 20 is provided, this running loosely on the shaft and having a conical clutch recess at 21 in its right face. Keyed upon the shaft 53 to the right of the belt pulley is a double-acting shifting clutch member 22 having a left cone 23 adapted to frictionally engage in the recess 21 mentioned, and a right cone 24 adapted to engage in a corresponding recess 25 in a non-rotating clutch or brake member 26 surrounding the shaft and connected to the bearing standard 54. In order to shift the clutch member 22 to right or left, it is provided with a peripheral groove 27 engaged by the opposite pins 28 of a forked clutch lever 29, which is pivoted at 30 to a fixed bracket 31. The shift lever 29 has an extension 32 pulled rightward by a spring 33 so as to normally engage the clutch member 22 with the non-rotating complementary clutch member or brake 26, thus holding the main shaft at rest.

For shifting the clutch to cause the shaft to be driven, the lever 29 is provided with a rightward extension 34 connected by a link 35 with a reversing lever 36 centrally pivoted and having a pedal rod 37 extending to a pedal near the floor; so that when the pedal is depressed the clutch lever 29 and shifting clutch member 22 are thrown to the left causing the cone 23 to engage the recess 21 of the belt pulley 20, and thus bringing about full speed drive. When the pedal is released, the spring 33 comes into action to force the clutch member 22 to the right, and its engagement with the brake member 26 will bring the shaft quickly to rest. There is but slight rotary momentum in the present machine owing to the absence of cams or other heavy rotary parts, and the shaft can be brought to rest by the application of friction, as shown, within a quarter rotation or less, and quite accurately as to final position.

It is desirable to have the shaft stopped at the end of a stitch cycle, that is in the position shown in the various figures of the drawings, and with the needle engaged within the work, because otherwise the final stitch will not have been completed. In order to secure this result there is provided a guard which prevents the application of the stopping friction, that is, keeps the co-acting members 24 and 26 apart, until a predetermined extent, e. g., a quarter rotation before the desired final stopping point. This guard consists of a disk 38 pinned to the shaft so as to rotate with it and having a groove at 39 coöperating with a guard pin 40 shown as mounted to slide to right and left in the bearing standard 54. The guard pin 40 is connected by a link 41 with the clutch lever 29 so that the latter cannot move rightward until the guard disk 38 allows the pin 40 to move to the right. At about a quarter rotation before the final stopping point, the pin 40, pulled to the right by the spring 33, is able to drop into the groove 39 of the disk 38. Fig. 5 shows this position in dotted lines. The nature of the stopping friction and the strength of the spring 33 are such that the shaft 53 will come to a stop within about a quarter rotation so that the pin and groove would finally stand about as indicated in full lines in Fig. 5. A slight variation one way or the other would not be of consequence. In case the friction is insufficient, the groove 39 may be enlarged at its extremity and provided with a spring buffer device 42.

In this class of machine it is further desirable to be able to readily back up the shaft to the extent of about a quarter revolution for the purpose of retracting the needle from the work so that the work can readily be removed from the machine. It has been the time worn practice to bring the shaft to rest at the end of a stitch cycle and then reverse it by hand to extract the needle. This invention provides a very simple, convenient and efficient means for permitting and bringing about this end. This is accomplished herein specifically by adapting the non-rotating clutch or friction member 26 to a slight rotatability, namely, a quarter revolution or thereabout, depending on the extent of reverse movement needed to bring the empty needle back out of the work. To permit this limited movement the friction brake member 26 is shown as loosely surrounding the shaft 53 but limited in its movement by a fixed pin 43 secured in the bearing standard 54 and projecting leftward into a quadrantal groove or recess 44 in the member 26, as shown in the right-hand view, Fig. 6. A coil spring 45 tends to rotate the member 26 forwardly so as to hold it normally against the stop pin 43, as shown in Fig. 6. Forwardly is usually in the direction of the larger arrows on member 26 in Figs. 4 and 6. This spring 45 has its end 46 projecting into the bearing standard 54 and its other end 47 into the brake member 26. This arrangement permits the shaft 54 after its stoppage at the end of a stitch cycle to be reversely rotated, in the direction of the short arrows, and to the extent of the groove 44, that is, about a quadrant, despite the frictional grip of the member 26 on the clutch member and shaft. Moreover, the length of the slot 44 gives the operator the proper indication as to how far to reverse. The engagement of the guard pin and disk 40 and 38 is of no hindrance, for the quadrantal slot 39 permits the disk and shaft to be reversed from the full to the dotted position of Fig. 5.

The operator performs this reversing operation by the hand wheel 55, turning it toward him until one of the pins 40 or 43 is struck. The needle is now retracted and the work may be extracted, and new work inserted. The spring 45 may be made insufficiently strong to advance the entire machine so that the operator is not compelled to hold his hand upon the retracted wheel 55 when extracting a shoe. For restarting, the depression of the pedal rod 37 throws the clutch member 22 across to the constantly rotating belt pulley and withdraws the guard pin 40 from its disk, and the machine promptly assumes full speed, while the spring 45 immediately brings the friction member 26 back to the normal position shown in Fig. 6.

Another advantage of the stop motion described is that in certain classes of work, for example in making the sharp turns at the toe of a pointed shoe, it may be desirable to proceed by making one or two stitches at a time so that the operator may more deliberately swing the shoe around to accord with the progress of the stitching. By the described mechanism he may depress and immediately release the pedal, which action will start up the machine and cause its prompt stoppage, after a single stitch if desired, and always at a point with the needle in the work so that the work may be swung or pivoted about the needle for further operations. The described hand reversing action for finally extracting the needle from the work being non-automatic, may be postponed until the complete stitching of the shoe, when, by reversing the hand wheel as described, the operator renders the shoe readily removable and a new one insertible.

The remainder of the machine is of a nature to coöperate in the described stopping, restarting and reversing actions. The stopping as described leaves the needle in the work, with the stitch completed, the starting or restarting causes the stitching to proceed, the final reversal retracts the needle and frees the work, and the mechanism for actuating the needle and other stitching instruments is such as to avoid substantial weight or momentum, rendering the quick frictional stoppage practicable. We come now to the operating shaft and stitching connections.

The main shaft 53 is a crank shaft having a plurality of cranks or pins which actuate several crank rods or pitmen. The first or left-hand crank 56 is located between the bearing standard 54 and the frame wall 51, while the second or right-hand crank 57 is inside or between the two frame walls 51 and 52. The two cranks have a different timing, the inside crank being between 45 and 90°, preferably about 60° in advance of the outside crank. The inside crank is elongated and accommodates a plurality of pitmen, three being shown, which extend in different directions, so that they have different timing, and so that the single crank 57 has the effect of three cranks.

Engaging the first or outside crank 56 is the pitman 61, and engaging the inside crank 57 are the pitmen 62, 63, 64, the four pitmen being arranged from left to right in the order mentioned. The coöperative actuation of all of the stitching instruments A′ to H is effected by these four pitmen through the intermediate mechanism to be described.

The mechanism may best be described by considering in turn each of the instruments A′ to H and tracing out from the general figures and the detached views the actuating connections to it from the cranks and pitmen already described.

We would first mention that there are several important rocking members or rockers, each comprising one or more arms, which are continuously oscillated to and fro by the pitmen, and each of which in turn transmits the motion to one or more, in some cases several, of the stitching instruments, simplifying and improving the mechanism and operation.

Figure 2:
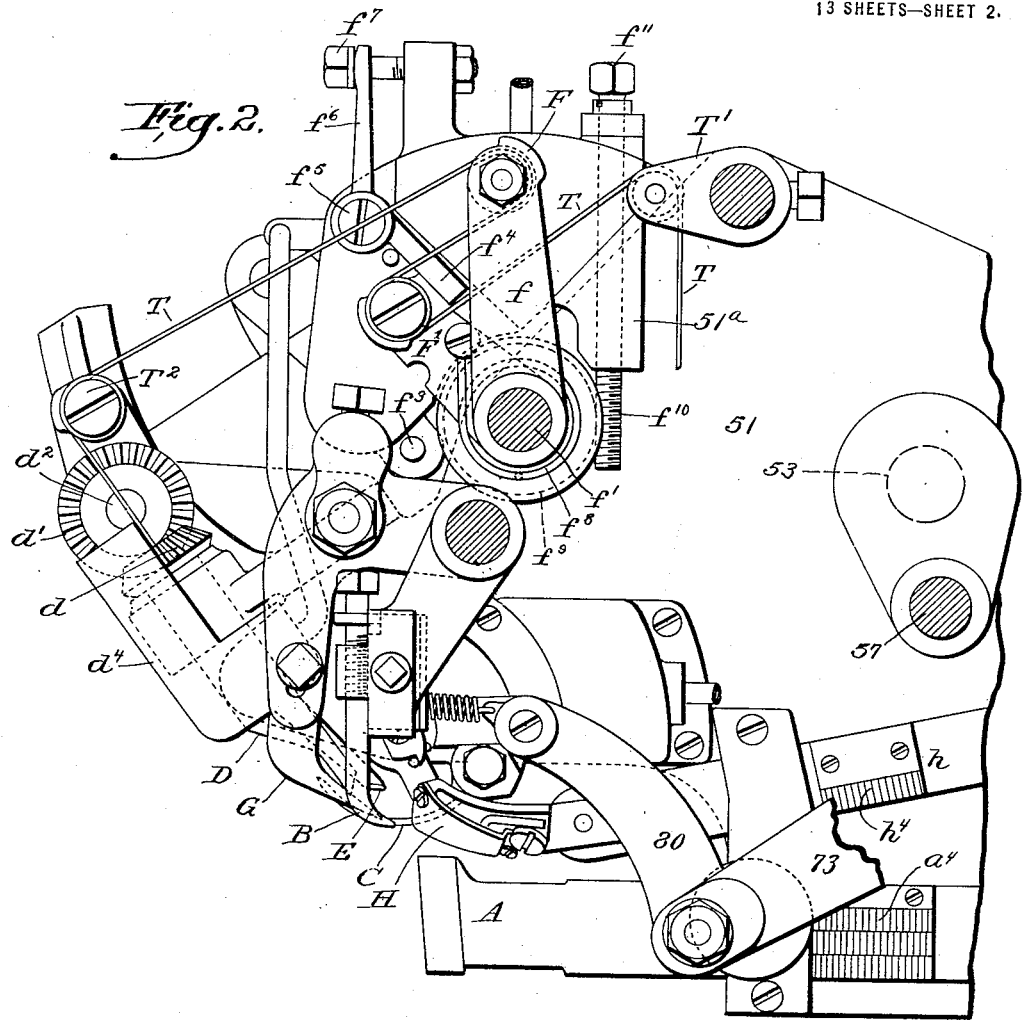
Fig. 2 is a right elevation on a larger scale than Fig. 1, and omitting the rear portions of the mechanism.

It should be explained that in all the figures the parts are shown in their position occupied at the end of a stitch cycle, that is, when the last formed stitch has been properly taken up and set. In this condition the needle stands in the work or forward, as indicated in Figs. 1, 2 and 7. In addition to the showing of the parts in such position, most of the elevational views show also, in dotted lines, the opposite positions or limits of motion of the several instruments. In the elevational view the fulcra, axles or shafts which are stationary in position are distinguished by being cross-sectioned to differentiate them from mere connecting or floating pivots.

The work support A is not movable except as it yields to the pressure of the work and is returned forwardly by the spring $a^3$; but, as explained, the work support is required to be held rigidly forward at certain periods, and for this purpose the locking device or dog A' is provided. See Figs. 23–25. This dog is controlled through its shank, which has a slanted or cam-like extremity $a^2$, as indicated in Fig. 25, coöperating with the lower end of the rock arm 74, part of the rocker 71 before mentioned, so that, when the rock arm swings forwardly to the dotted line position of Fig. 23, it throws the cam $a^2$ to the left and removes the dog A' from the teeth $a^4$ of the work support. When the reverse movements take place the dog is returned by spring pressure into engagement with the rack so as to lock the work support forwardly, as explained.

It will be convenient at the same time to describe the analogous locking and releasing of the welt feed member H, which herein has a separate locking dog H', and it will be observed from Fig. 23 that the shank of this dog is cam shaped at $h^2$ and operated similarly to that of the work support dog, namely, by the swing of the rock arm 74; and the parts are timed so that both instruments A and H are locked forward at the time the work feed device G moves rearwardly against the work.

The channel guide B is reciprocated to and from the work from the crank 56, which drives the short pitman 61, the free end of which is pivoted to and guided by the arm 67 of the rocking lever 66, the hub 68 of which is a sleeve loose on the fulcrum or axle $f'$ already mentioned. See Figs. 19 and 20. Link 75$^a$ extends from the pivoted junction of 61 and 67 to the forward free end of the rock arm 75 of the rocker 76. This rock arm 75 is mounted on the axle or rock shaft 76$^a$ which also carries downwardly extending rock arms 77 and 96, these unitary parts jointly constituting the aforesaid rocker or rocking member 76. The free end of the downward arm 77 of the rocker 76 is connected by a link 78 with a longitudinally sliding member 79 that is connected by a stud and slot device 79$^a$ to the arm $b^2$ of the channel guide. The motion of the pitman 61 is thus communicated to the channel guide in the manner indicated in the full and dotted lines in Fig. 19. The hub $b'$ of the channel guide shank is shown as a sleeve loose on the axle or rod 101 on which the feed point is sleeved, and the two hubs or sleeves lie between collars 102 on the rod, so that when the latter shifts axially to operate the feed point the channel guide is caused to move along with the shaft and feed point.

The needle C carried on the oscillating needle block $c$ is operated from the big rock lever 73 through a floating link 80 extending from the end of the lever to the needle block, as shown in Figs. 7 and 8.

The thread looper D is caused to rotate in reverse directions by the elements $d$, $d'$, $d^2$, $d^3$, already described. The last mentioned of these elements is the pinion $d^3$, as shown in Figs. 11 and 12. This is reversely driven by a rack 85 which takes its actuation from the pitman 61, and rocker 66, already mentioned, which latter is provided also with the forwardly extending rock arm 83, connected by a short link 84 with the swinging rack 85 already mentioned. This mechanism is simpler and better than that shown in the said prior patent for actuating the looper.

The thread hook E is actuated from the rocker 66, that is, from a short downwardly extending arm 87 formed thereon, through a link 88 extending from said arm to the oscillating shank $e'$ of the thread hook, as seen in Figs. 13 and 14. This is a simplification and improvement on the prior patent.

The take-up F is actuated through its rearwardly extending arm $f^2$ from the pitman 64, as follows. The pitman is guided in its movements by a swinging arm 91 loose on the axle or shaft 76$^a$ of the rocker 76. Extending from the connected extremities of the pitman and arm is a link 92 connected in turn to the arm $f^2$ of the take-up, as shown in Figs. 9 and 10. The oscillatory take-up shaft $f'$ also serves as an axle for the rockers 66 and 69.

The feed point G has its backward and forward reciprocating movements, for engaging and disengaging the work, effected from the swinging arm or rocker 69 already mentioned. See Figs. 15 and 16. This member rocks about the axle or shaft $f'$ in the forward part of the machine. At an intermediate point the arm 69 has pivoted to it a short link 93, the free end of which has secured to it a stud 95, extending leftward and engaging slidingly a circular hole in the arm $g^2$ of the feed point, so that the latter is caused to go through the reciprocating movements indicated by the full and dotted lines in Fig. 15. Near its hub or fulcrum, the arm 69 is enlarged and slotted at 94 to accommodate the movement of the stud 95.

Figure 17:
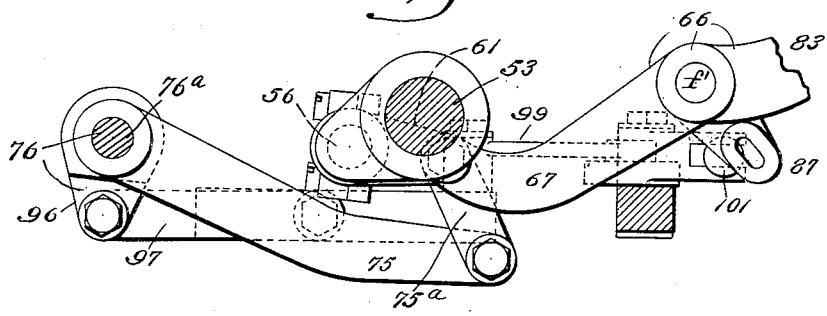
Fig. 17 is a detail left elevation showing so much of the mechanism as takes part in the longitudinal or feeding motion of the work feed device G and channel guide B.
Figure 18:
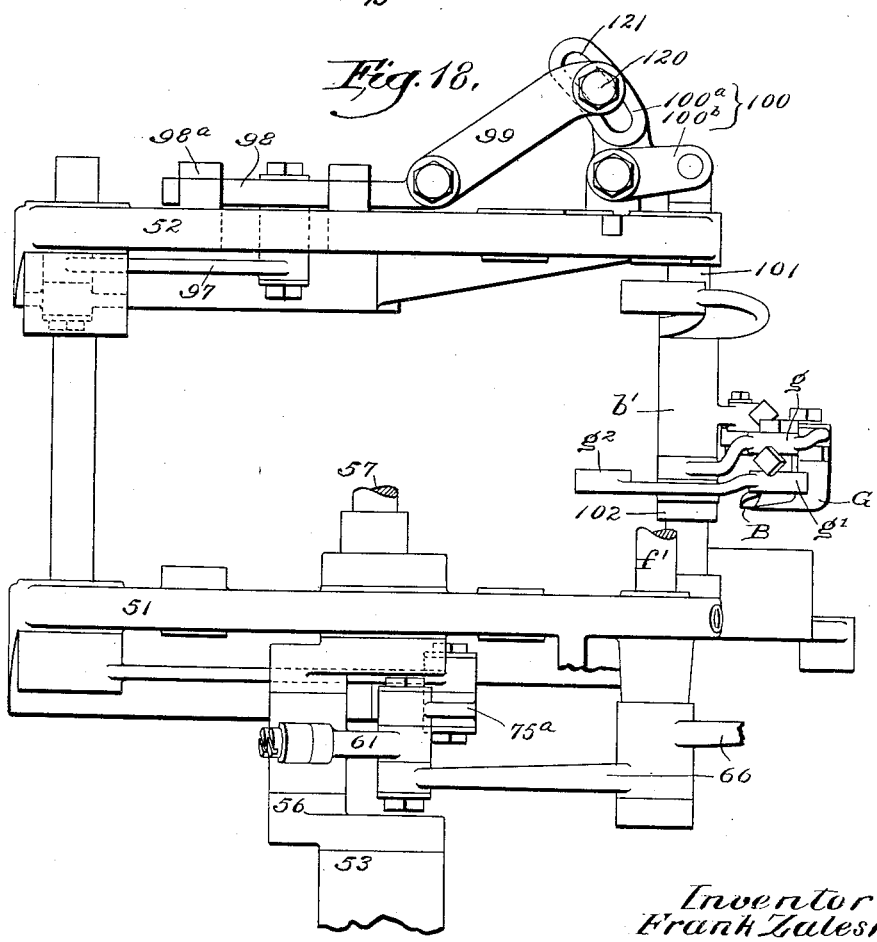
Fig. 18 is a plan view thereof.

The longitudinal or axial or feed and return movements of the feed point G, and with it the channel guide B, are effected from the outside crank 56 and pitman 61 by the mechanism shown more particularly in Figs. 17 and 18. As before explained, the pitman through a link 75$^a$ oscillates the rock arm 75 of a rocker 76 which includes also a rock shaft 76$^a$ and a downward arm 77 taking part in the channel guide reciprocation. As seen in Fig. 17, the rocker 76 comprises also another downwardly extending arm 96. This oscillating arm 96 is connected by a link 97 with a sliding bar 98 guided in bearings 98$^a$. The bar slides forwardly and backwardly, and at its forward end is connected by a link 99 with the rightwardly extending arm 100$^a$ of the bell crank lever 100, the forwardly extending arm 100$^b$ of which is pivotally connected to the feed rod or sliding axle 101, before mentioned. The rod 101 is provided with collars 102 spaced apart and between which are located the hub $g'$ of the feed point, and the hub $b'$ of the channel guide. Thereby each of the two instruments B and G can be swung about the sliding shaft 101 for engaging and disengaging the work, and can be shifted rightward and leftward with the shaft for feeding purposes. The longitudinal feed and return movements of the instruments B and G are permitted by the sliding connections 79$^a$ in the channel guide connections and the similar sliding connection of the stud 95 in the feed point connections.

Figure 21:
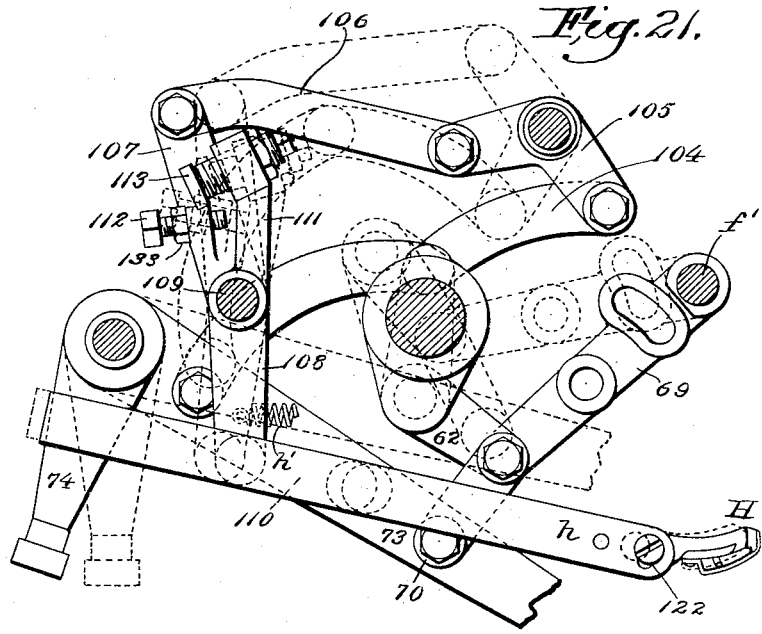
Fig. 21 is a detail left elevation showing so much of the mechanism as takes part in the actuation of the welt feed device H.
Figure 22:
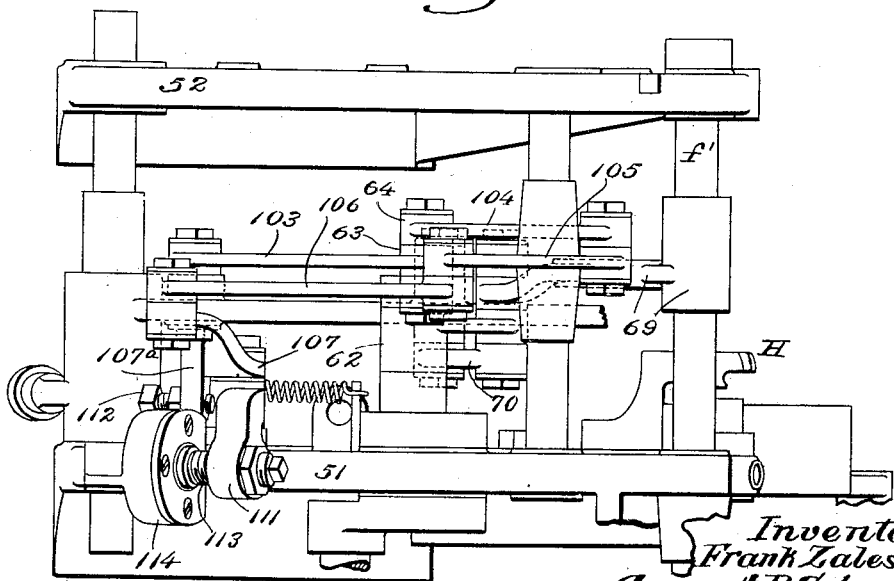
Fig. 22 is a plan view thereof.

The welt member H which both guides and feeds the welt and is carried upon the sliding shank $h$ requires a quick backward movement and return at the proper point in the cycle. It may be actuated in different ways, and for turn shoes may be omitted. In Figs. 21 and 22 it is shown as actuated from pitman 63 and rock lever 73, as follows. Pivoted to lever 73 near its fulcrum is a link 103 connected at its other extremity to the free end of the pitman 63. From this pivotal point extends link 104 to the downward arm of a rocking bell crank lever 105, the rear arm of which is connected by a link 106 to a swinging arm 107 fulcrumed at 109. On the same fulcrum is a downwardly extending arm 108 connected by a short link 110 to the welt feed device shank $h$. It has been explained that the welt feed device H is moved forwardly by the spring $h'$. The mechanism merely pushes or bunts it backwardly only. For this purpose the arm 108 has an upward extension 111 arranged to be struck by a stop 112 on an extension 107$^a$ of 107 on each forward swing of the latter. The arm 111 also has a spring stop 113 which determines the extent of return or rearward motion of arm 111, that is, the forward position of the shank $h$. The stop 113 contacts a resilient buffer 114 on the frame wall 51, see Fig. 22.

The train of parts 103 to 110, inclusive, and as well the pitman 63, a total of eight movable parts, shown in Figs. 18 and 19 for actuating the welt feed device H, may be replaced by a single movable part 115, shown in Fig. 26. This at its upper end may be fulcrumed to the left frame wall 51, and may be provided at 116 with a roller so positioned as to be struck by the crank 57 on each rotation. The lower end of the arm 115 has a stud and slot connection 117 with shank $h$ of the welt feed device, with the spring $h'$ pulling the latter forwardly as before. The motion of the welt feed device is a quick rearward jump at the proper point in the cycle and return, and as the parts are light and the motion is short, the described connections are adapted to perform the operation without causing appreciable noise or shock, while dispensing with seven movable parts. It is desirable to have shock absorbing or rubber buffers for both the rearward and return movements of the shank $h$, and for this purpose it is provided at its rear end with a pair of stops 118, 118$^a$, one coöperating with a buffer 114$^b$ in the frame wall 51, and the other with a similar buffer 114$^a$ in a bracket 119 secured to the wall. In dotted lines, Fig. 26, are shown the position of the crank 57 and roller 116 when the former has moved the latter rearward.

We herein use the word "axle" as meaning a bar, shaft, spindle, or the equivalent, which affords a fixed axis or center, and on or with which any of the various members rock, turn, swing or fulcrum. We use the word "shaft" in the narrower sense of an axle which turns or rocks with its members. For example, the spindle 76$^a$ is an axle or shaft with respect to the arms 75, 77 and 96, constituting the rocker 76, but is merely an axle with respect to the rocker 71 or the rocker arm 91, which turn loosely on it.

We have not attempted in the above description of the parts to point out completely the relation between the various pitmen, links, levers, etc., with the precise location, size, angle and speed of each part, since that would require great length of description, whereas the disclosure in the drawing speaks for itself, and supports the claims presented. The following considerations, however, deserve specific mention.

The shaft, looking at the machine from the left, rotates counterclockwise, and the outside crank 56 is shown as timed 60° behind the inside crank 57. The various pitmen extend in different directions from the several cranks, and this arrangement in conjunction with the form, position, size and arrangement of the parts numbered 66 to 113 secures the coöperation desired for the various active instruments A' to H of the machine. Of the four pitmen, one of them, 61, is shown on the crank 56, while the crank 57 drives a plurality of pitmen 62, 63, 64, which, as stated, extend in different directions, and which, therefore, work with different timing.

The various trains of connections to the several stitching instruments all commence with the shaft 53, and in fact with one or the other of the cranks 56, 57, and in fact, with one or another of the pitmen 61, 62, 63, 64; excepting that a minor action, such as the trivial back and front motion of the welt feed device, involving no momentum to speak of, may be otherwise actuated, as for example by the forcing back by crank 57 of roller 116, as shown in Fig. 26.

The actual link and lever connections have been specifically described, and among these, as stated, are included certain rockers or rocking members, each of which takes part in the actuation of two or more of the stitching instruments. Thus, one of the rockers is the lever 69, fulcrumed at $f'$ forward of the main shaft and oscillated by the pitman 62; this rocker having connections 93 to the feed point G for reciprocating it, and 70 to the rocker 71. Rocker 71, actuated from parts 57, 62, 69 and 70, comprises a hub 72 loose on the axle $76^a$ to the rear of the main shaft, from which hub project the two rock arms 73 and 74. Arm 73 connects by link 80 to oscillate the needle C; and in conjunction with the pitman 63 has a train of connections 103 to 110 for operating the welt feed device H; and the rocker 71 also has its downward arm 74 arranged to control both the locking dogs A' and H' for the work support and welt feed device. Another rocker 66 comprises the sleeve or hub 68 loose on the axle $f'$ forward of the main shaft, and comprises arms 67, 83 and 87. This rocker through its arm 83 and connections 84, 85 operates the looper D, and through its arm 87 and link 88 operates the thread hook E, and, as stated, through link $75^a$, oscillates the rocker 76. This last rocker comprises arms 75, 77 and 96. It operates through its arm 77 and connections 78 to 79 for reciprocating the channel guide, and through its arm 96 and connections 97 to 101 for giving the forward and return feeding movements to the feed point and channel guide. The rockers 71 and 76 are co-axial with each other, and the rockers 66 and 69 are co-axial with each other, so that we have forward of and to the rear of the main shaft two main axes, about which the principal rockers oscillate.

The total number of described and numbered movable parts between the main shaft 53 and the stitching instruments, consists only of the four pitmen, four rockers, six other oscillating levers or arms, fourteen links and three slides, and this small number of parts is well able to be compactly juxtaposed and thus accommodated within the small space shown, so as to extend to and actuate coöperatively the stitching instruments. When the welt feed device H is operated as in Fig. 26, instead of as in Fig. 21, the total movable parts in the actuating mechanism are seven less in number, or only twenty-four in all, performing the oscillations of the seven movable instruments B, C, D, E, F, G, H, the feed movements of B and G, and the control of A' and H'. The principles and general plan being thus explained, it will be understood that still further reduction of parts, within our invention, may be effected.

While the several stitching instruments coöperate generally to retain the advantageous stitch cycle known to the art, it will be observed that the to-and-fro movement of each of the instruments is of a harmonic nature, being, as before explained, free from any such jolting action as occurs with cams. Therefore, the motions of the several instruments are improved, as well as the actuating mechanism. The harmonic action is generally indicated in the diagram in said prior patent, in which it will be seen that each instrument makes its to-and-fro movement in a special and very smooth and easy manner, without sudden changes of speed or direction, yet without conflicting with the desired stitch cycle. According to this invention these motions are attained, as to the greatest number or all of the instruments, by trains of mechanism consisting wholly of pitmen, links and levers, crank-actuated from the operating shaft.

The coöperative action of the several instruments which is secured by the shown arrangements of cranks, links and levers, may be substantially as follows:

The hooked, curved needle C is adapted, fitted and operated to advance in an arc and penetrate the work, then to receive a loop of the thread, then to return through the work with the thread loop, and on the succeeding penetrating stroke to occupy such thread loop; and this action is harmonic, the speed reducing by the law of harmonics from the maximum to zero and reverse, without any abruptness, whip or vibration, yet timed to coöperate exactly with the harmonic looper, thread hook and take-up motions, and the cycle being repeated stitch after stitch to produce a seam of chain stitching connecting the sole lip to the upper and to the welt when one is provided.

The thread looper D is movably fitted and harmonically actuated to rotate in reverse directions to place a thread loop upon the hook of the needle on each penetrating stroke of the needle. The actuating mechanism herein gives a slightly quicker or earlier looping action than said prior patent, insuring the needle taking the loop.

The thread hook E is movably fitted and harmonically actuated to take the thread between the looper and the work and to assist the placing of the thread on the needle, the hook operating to disengage itself from the thread after the loop is safely on the needle, that is, when the needle has receded substantially. Its action herein is more effective than in said prior patent, being quicker and earlier with respect to the needle motion.

The take-up F is movably fitted and harmonically actuated to take up the slack thread during the harmonic penetrating stroke of the needle and to similarly give thread on the return stroke.

The work feed device or feed point G is movably fitted and harmonically actuated to engage with the work and to advance the work while the needle is out of the work and thereafter to disengage the work and then return, repeating these actions for each stitch. Herein it enters the work slightly earlier than in said prior patent, so as to have firm engagement before the feed movement begins.

The channel guide B reciprocates into and out of the sole channel in different timing from the feed point, and is actuated also to advance and recede in conjunction with the feed device along the line of feed.

The movement of the feed device G and channel guide B along the direction of the work feed, which is substantially parallel to the crank shaft 53, is necessarily at right angles to the planes of movement of substantially all of the other connections, and the slide rod or axle 101 by which the motion is effected is shown parallel to the operating shaft. The bell crank 100 constitutes a contrivance which is adapted, when one arm is moved substantially at right angles to the length of the rod 100, or in a fore-and-aft direction, to produce motion in the other arm, and in the rod, feed device and channel guide, parallel to the main shaft. All the other connections to the feed device and channel guide are shown as swinging wholly in the planes at right angles to the shaft.

The welt feeding guide H is movably fitted and operated to retract slightly to measure a predetermined length of leather strip which is to constitute the welt, this being done while the needle is engaged in the work, and subsequently to lay the welt against the work during the feed.

The work support A intermittently becomes yieldable, in alternation with the action of locking it forward. The dogs A' and H' lock forward the work support and the welt feeder, and thereby hold the work firmly to the channel guide during the retraction of the needle.

The following among other adjustments may be made on the described machine. The feed of the work or the extent of reciprocation of the feed slide rod 101, and with it the feed point G and the channel guide B, in each stitch, may be adjusted by shifting the pivot stud 120 of the link 99 along the slot 121 of the arm 100$^a$ of the bell crank 100, which actuates the slide rod 101, see Fig. 18. The position of the welt guiding device H on its shank is adjustable by the set screw 122, Fig. 21. The channel guide B may be adjusted to receive different extents of motion, for example, by the set screw 123, by which the rear end of the link 78 may be set at different radial distances from the axis along the groove 124 in the rocker arm 77, which actuates the link, Fig. 19. If the set screw be adjusted concentrically to the rock shaft 76$^a$, the link and connected parts will have no motion, and the channel guide will be held out of action. The throw of the needle C may be altered by shifting the pivot stud 125 along the slot 126 in the needle lever 73, Fig. 7. The motion of the thread hook E may be altered as desired, by shifting the pivot stud 127 of the link 88 along the groove 128 of the rocker arm 87, Fig. 13. The reciprocating motion of the feed point G may be adjusted. It has been stated that the feed point is carried on shank $g$, Figs. 15 and 16, which is rigid with arm $g'$ that has rearward extension $g^2$. For adjustment the bolt 129 is loosened, and shank $g$, being slotted, may be relatively swung about axle 101. To adjust it, an ear 130 is provided on $g$, having four lugs 131 to receive the flange 132 and shank of screw 133, the lower end of which is threaded into the front end of arm $g'$. Turning screw 133 shifts G forwardly or rearwardly, and when adjusted the screw 129 locks the arms $g$ and $g'$ together again.

The rate of feed of the welt may be adjusted by adjusting the stop screw 112, already mentioned, see Figs. 21 and 22, mounted on the arm 107 so as to engage and actuate the upward extension 111 of the arm 108; and the adjustment of the screw may be secured by a lock nut 134. With such adjustment the predetermined oscillation of the arm 107 gives various movements of the arm 108 and the connected welt feed device. In the modification shown in Fig. 26, the roller 116 on the arm 115, which is bunted or kicked backward by each rotation of the crank 57, is shown as adjustably mounted on the arm, by being secured to a slide block 135, laterally adjustable on a slide 136, longitudinally adjustable along the arm 115 between guides 137. A screw 138 laterally adjusts the roller and thus determines the extent of throw of the instrument H. A change of the roller for a larger size will give a less abrupt action. Adjusting the slide 136 along the arm 115 serves to change the timing of the action, and bolts 139 secure the adjustment.

It will thus be seen that we have described a welt and turn sewing machine having the required instruments for stitching the shoe upper to the sole lip and to the welt, the same operating according to the principles and attaining the objects and advantages hereinbefore referred to. Since many matters of design, arrangement, form, combination, details and other features may be variously modified without departing from the principles involved, no limitation to such features is intended excepting in so far as referred to in the appended claims.

What is claimed is:

1. In a machine of the kind described, in combination with the coöperating stitching instruments, including needle, thread hook, looper, take-up and work feed device, a continuously rotating operating shaft having a crank 57 and a crank 56 timed behind the crank 57, connections from crank 57 for advancing and retracting the needle in each stitch cycle, an axle $f'$ substantially forward of the shaft, a rocking member on axle $f'$ having an arm 67 extending toward the shaft, and a forward arm 83, a pitman 61 shorter than the arm 67, connecting said crank 56 to said arm 67, a device comprising oscillating rack 85 for reversely rotating the looper, and an operative connection between the arm 83 and said rack, said parts being proportioned substantially as shown, whereby to give substantially the described coöperation between the needle and looper.

2. In a machine of the kind described, in combination with the coöperating stitching instruments, including needle, looper, take-up and work feed device, a continuously rotating operating shaft having a crank 57 and a crank 56 timed behind the crank 57, connections from crank 57 for advancing and retracting the needle in each stitch cycle, an axle $f'$ substantially forward of the shaft, a rocking member on axle $f'$ having an arm 67 extending toward the shaft, and a forward arm 87, a pitman 61 shorter than the arm 67 connecting said crank 56 to said arm 67, and a link 88 extending from said arm 87 to the shank of the thread hook, said parts being proportioned substantially as shown, whereby to give substantially the described coöperation between the needle and thread hook.

3. In a machine of the kind described, in combination with the coöperating stitching instruments, including needle, thread hook looper, take-up and work feed device, a continuously rotating operating shaft having a crank 56, a pitman 61 on said crank, a rocker 66 fulcrumed forward of the shaft oscillated by said pitman, connections from said rocker for actuating the looper and other connections from said rocker for actuating the thread hook, said parts being proportioned substantially as shown, whereby to give substantially the described coöperation between looper and thread hook.

4. In a machine of the kind described, in combination with the coöperating stitching instruments, including needle, looper, take-up and work feed device, a continuously rotating operating shaft having a crank 57, a rocker 69 fulcrumed forwardly of the shaft, a pitman 62 between said crank and rocker, a link 93 from said rocker to reciprocate the feed device to and from the work, a link 70 actuated by said rocker, a rocker 71 fulcrumed to the rear of the shaft and actuated by said link 70, and a link 80 from said rocker 71 to oscillate the needle, said parts being proportioned substantially as shown, whereby to give substantially the described coöperation between the needle and work feed device.

5. In a machine of the kind described, in combination with the coöperating stitching instruments including needle, looper, take-up, and work feed device, a continuously rotating operating shaft having a crank 57 and a crank 56 timed behind the crank 57, an axle $f'$ substantially forward of the shaft, a rocking member 69 on said axle $f'$, a rocking member 76 fulcrumed substantially to the rear of the shaft, a pitman 61 on said crank 56 for oscillating said rocking member 76, a pitman 62 on said crank 57 for oscillating said rocking member 69, a sliding rod 101 carrying said work feed device, a link 93 from said rocker 69 for reciprocating said work feed device, and connections from said rocker 76 for advancing and returning said slide rod and work feed device, said parts being proportioned substantially as shown, whereby to give substantially the described coöperation in the reciprocating and advance and return movements of the work feed device.

6. In a machine of the kind described, in combination with the coöperating stitching instruments including needle, looper, take-up, and work feed device, a continuously rotating operating shaft having a crank 57, pitmen 62 and 64 on said crank, an axle 76ª substantially to the rear of said shaft, a rock lever 73 fulcrumed on said axle and oscillated by said pitman 62, said rock lever extending beneath the shaft to a point forward thereof, a link 80 extending from the forward end of said rock lever for oscillating the needle, an oscillating guide arm 91 for guiding the free end of said pitman 64, said take-up mounted to swing about a fulcrum substantially forward of said shaft and having a rearward extending arm $f^2$, and a link 92 by which said pitman 64 oscillates said extension arm $f^2$, said parts being proportioned substantially as shown, whereby to give substantially the described coöperation between the needle and take-up.

7. In a machine of the kind described, in combination with the coöperating stitching instruments, including needle, looper, rotating take-up and work feed device, a continuously rotating operating shaft, arranged transversely behind the sewing point, a crank 56 on said shaft, a pitman 61 on said crank, and connections from said pitman to said looper, comprising lever arm 67 oscillated by said pitman and fulcrumed forward of the shaft, lever arm 83 rigid with said arm 67, swinging rack 85 oscillated by said arm 83, and gear shaft $d^2$ between said rack and looper.

8. In a machine of the kind described, in combination with the coöperating stitching instruments, including needle, looper, take-up and work feed device, a continuously rotating operating shaft, arranged transversely behind the sewing point, a crank 57 on said shaft, a pitman 62 on said crank, and connections from said pitman to said work feed device for reciprocating it to and from the work, comprising a lever 69 fulcrumed forward of the shaft and having its free end connected to the pitman, and a link 93 from said lever to lever arm $g^2$, the latter beyond its fulcrum having a forward arm $g'$ on which the feed device is carried.

9. In a machine of the kind described, in combination with the coöperating stitching instruments, including needle, looper, thread hook, take-up and work feed device, a continuously rotating operating shaft, arranged transversely behind the sewing point, a crank 56 on said shaft, a pitman 61 on said crank, and connections from said pitman to said thread hook, comprising lever arm 67 connected to the pitman and fulcrumed forward of the shaft, a second lever arm 87 rigid with 67, and a link 88 between arm 87 and the thread hook.

10. In a machine of the kind described, in combination with the coöperating stitching instruments, including needle, looper, take-up, welt feed device and work feed device, a continuously rotating operating shaft, arranged transversely behind the sewing point, a member 57 on said shaft, an arm 115 to the rear of said shaft adapted to be contacted and thrust rearwardly by each revolution of said member 57, shank $h$ carrying the welt feed device and connections between said arm and said welt feed device.

11. In a machine for stitching shoe uppers to sole lips, the combination with the needle, looper and work feed device, of a reciprocating take-up F, a reciprocable auxiliary take-up device F′, means yieldingly acting on the same to pull on the thread, a pivoted stop $f^4$ for said device, means yieldingly holding said stop toward said device, and means for regulating the tension of said first mentioned yielding means.

12. In a machine for stitching shoe uppers to sole lips, the combination with the needle, looper and work feed device, of a reciprocating take-up F, a reciprocable auxiliary take-up device F′, means yieldingly acting on the same to pull on the thread, a pivoted stop $f^4$ for said device, means yieldingly holding said stop toward said device, and means for regulating the tension of said second mentioned yielding means.

In testimony whereof we have affixed our signatures hereto.

FRANK ZALESKI.
AUGUST R. SCHOENKY.